United States Patent Office 3,825,462
Patented July 23, 1974

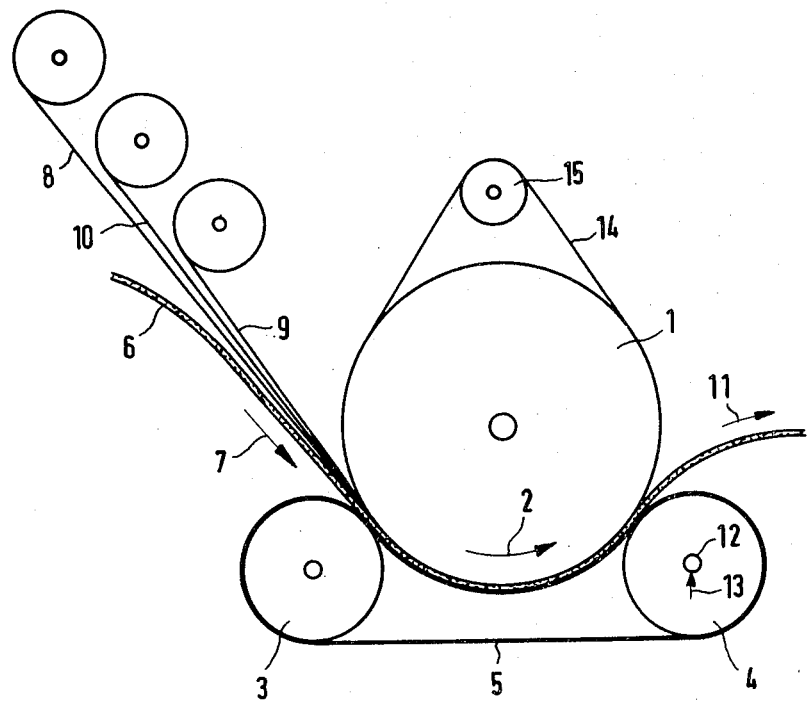

3,825,462
APPARATUS FOR COATING CHIPBOARD WITH A LAMINATED SHEET OR FOIL
Hubert Ettel, Teichhutte, Harz, Germany, assignor to Wilhelm Mende & Co.
Filed Dec. 22, 1972, Ser. No. 317,681
Claims priority, application Germany, Jan. 12, 1972, P 22 01 302.1
Int. Cl. B32b 31/20; B31f 1/00
U.S. Cl. 156—582                                        6 Claims

ABSTRACT OF THE DISCLOSURE

A thermoplastic sheet is bonded to a thin chipboard by positioning the sheet and board on a continuously moving belt, heating the sheet and board to render the sheet plastic and pressing the sheet into intimate contact with the surface of the chipboard to bond the sheet thereto.

BACKGROUND OF THE INVENTION

The present invention relates to a press for coating thin chipboards with a laminated sheet or sheets.

A press for the coating of chipboards with thermoplastic sheets is known which comprises two press plates between which a chipboard is positioned, on which a sheet of thermoplastic plastic material is placed. The upper press plate is pressed by high pressure onto the chipboard covered with the sheet of thermoplastic material and at the same time heated to a temperature at which the thermoplastic material changes to a plastic condition. After a sufficient pressing time, the thermoplastic material becomes plastic and, because of the pressure flows into the pores in the surface of the chipboard and is bonded thereto.

Since the temperature at which the plastics material changes to a plastic state and to which the upper press plate must be heated, is above the boiling point of water, the residual moisture which is unavoidably present in the chipboard evaporates and produces a vapor pressure which, when the upper press plate is relieved of load, presses against the plastics material sheet and detaches the sheet from the chipboard, so that bubbles tend to form. For this reason in the case of the known press, the upper press plate is cooled before opening so that no vapor pressure, and thus no bubble formation, is produced. This known press is not only complicated and expensive owing to its discontinuous method of operation, but it also requires a considerable outlay on energy for operation owing to the heating and cooling which have to be carried out at each pressing operation.

SUMMARY OF THE INVENTION

The object of the present invention is to provide a press, for covering thin chipboards with sheets, which operates continuously and which also has a low energy consumption, and in which alternating heating and cooling are not required. The press has to be simple in construction and to be capable of operating in a completely automatic manner.

According to the present invention there is provided a press for coating thin chipboards with a laminated sheet or sheets, comprising a roller onto which a sheet laminate and the thin chipboard run and are pressed against its surface by a belt which is tensioned and is made to wrap partly about the roller.

In the press provided by the present invention, pressing is carried out continuously so that there are no down times between charging or discharging the press, and thus the operating speed is increased. The press pressure can also be kept very constant since it depends simply on enveloping the roller by the belt and the belt, owing to its flexibility or yieldability, can take up variations in thickness in the chipboard. This is contrary to the case in the known press with press plates where the surface of the plates are rigid and cannot compensate for irregularities or thickness tolerances in the chipboard. The advantage of compensating for thickness tolerances in the press of the present, invention is particularly apparent in the case of thin chipboards whose yieldability because of their inconsiderable thickness is only slight, so that press pressures cannot be compensated by yieldability.

The advantages of the underlying idea of the invention are fully apparent in a further development of the invention wherein the sheet consists of thermoplastic material and the roller is heated and is at a temperature at which the thermoplastic material changes to a plastic state. In this further development, the heating of the sheet of thermoplastic material and to a certain extent of the surface of the chipboard also is effected by contact with the surface of the heated roller. Thus, the temperature of the sheet or the surface of the chipboard rises as they pass through the region where the belt is looped about the roller, until finally it reaches the value at which the plastic material is in a plastic state and, owing to the pressure applied by the belt which is under tension, enters the pores in the surface of the chipboard and is bonded over a large area to the surface of the chipboard.

The length of the belt wrap-round region is of course made such that the chipboard with the sheet applied issues from the wrap-round region after an adequate bond has been effected. Thus, the region in which the temperature in the chipboard is above boiling point of water, at least in the region of the surface adjoining the sheet, is limited to the smallest possible extent, this being particularly small when the temperature of the roller is relatively high and thus a more rapid transfer takes place, the chipboard not being fully heated through.

Because of the small extent of the part of the belt wrap-round region in which the temperature is above the boiling point of water and owing to the position of this zone at the end of the said region, the vapor produced can escape both in the discharge direction and also in the direction oppositely thereto, so that a vapor pressure cannot be produced which could result in the formation of bubbles or blisters. This further development of the underlying idea of the invention thus combines the advantages of continuous pressing and avoiding blistering.

Another development of the invention proposes that two sheets of thermoplastic material are made to run with a thin chipboard, on the same side of the said chipboard, onto the heater roller, and between the two sheets a web of preferably printed paper or fabric is made to run in. With this constructional form of the invention, not only is a sheet bonded to the surface of the chipboard, but at the same time a web of paper or fabric is interposed which is connected in the same way to the neighboring sheets of thermoplastic material. In this way it is possible for example to incorporate webs of paper printed with wood patterns, so that a plastics lamination with a veneer effect is obtained.

It may also be advantageous to make a web of preferably printed paper or fabric run onto the heated roller together with the sheet of thermoplastic material and the thin chipboard, on that side of the sheet which is remote from the chipboard. In this further development, the printed paper or fabric is positioned externally so that a special surface effect is obtained. The surface can then be, for example, painted.

The sheet used can also be melamine resin impregnated paper or fabric, and, to accelerate the curing of the melamine resin, it may be advantageous to apply additional heat to the roller.

The sheet can lie directly on the roller. The surface of the roller can also be given a relief pattern so that in the pressing operation this relief is imprinted in the surface of the sheet.

Another constructional form of the invention consists in that an endless, co-running belt consisting of a material with poor adhesion properties, preferably "Teflon" (Registered Trade Mark) or silicone, runs onto the surface of the roller. In this way the sticking of the sheet to the roller or, in some cases, to the belt can be prevented. It is also possible for the co-running belt to be given a relief pattern.

Since, before the plastic material is plasticized, pressure does not produce any bonding in the case of a sheet of thermoplastic material but simply serves to produce a contact with the surface of the heated roller in order to permit heat transfer, according to a further preferred feature of the invention it is sufficient to press the belt additionally against the roller at least at a place which is at the end of the belt wrap-round region. Thus, the pressure applied by the belt can be relatively small before the point on the wrap-round region at which plasticization occurs, just at the point necessary for obtaining good heat transfer. Pressure application after plasticization does not require any lengthy period of time, so that a relatively long wrap-round region is not required for this purpose. This brief increased pressure can be obtained by a separate pressure application roller. Since heat transfer need not be effected directly by contact but can also be effected for example by heat radiation in this case it may even be sufficient to reduce the wrap-round region to almost nothing so that rolling only causes a brief application of the plasticized sheet against the surface of the chipboard.

According to a preferred feature of the invention it is also possible to provide the sheet and/or the surface of the chipboard adjacent the sheet with an adhesive substance. Continuous pressing also has an advantageous effect when using an adhesive connection.

DESCRIPTION OF THE PREFERRED EMBODIMENT

The invention will be further explained in detail with reference to the accompanying drawing, illustrating a diagrammatic cross-section of the press, according to the invention.

A heated roller 1 is continuously rotatable in the direction of arrow 2 and is enveloped over a wrap-round region between a guide roller 3 and a pressure application roller 4 by a belt 5. Belt 5 may be made of steel or a steel fabric which is coated with a heat resistant plastic material.

A preferably endless thin chipboard 6 runs continuously in the direction of arrow 7 into the space between the belt 5 and the surface of the roller 1. At the upper side, facing the upper side of the chipboard 6 and the surface of the roller 1, sheets 8 and 9 of a thermoplastic material and a paper web 10, printed with a wood veneer imitation, run onto the chipboard.

In the region where the belt 5 is wrapped about the roller 1, the chipboard 6 is pressed against the sheet 8, sheet 8 against the paper web 10, the paper web against the sheet 9 and the sheet against the surface of the heated roller 1. As a result, the heat from the heated roller flows into the sheet 8 and 9, into the paper web 10 and partly also into the surface of the chipboard 6, which becomes heated to the extent of its particular thermal conductivity. In the course of travelling through the wrap-round region, the temperature in the thermoplastic sheets 8 and 9 rises and towards the end of the said region reaches a value at which the material of the sheets 8 and 9 reaches a plastic state. At this instant, the plastic material of the sheet 8 is pressed against and into the surface of the thin chipboard 6 so that an intimate bond is effected. The same bonding is also obtained between the sheet 8 and paper web 10, and sheet 9 and paper web 10.

After the pressing and bonding have been carried out, the thin chipboard 6, now bonded to the thermoplastic sheets 8 and 9 and the paper web 10, issues from the wrap-round region in the direction of arrow 11.

In order that the belt 5 can be held continuously under tension, a shaft 12 of the pressure application roller 4 is preloaded in the direction of arrow 13. The direction of force has a component directed towards the surface of the roller 1. The pressure application roller 4 therefore increases the pressure on the chipboard by being pressed against it. In this way it is possible to keep the tension of the belt 5 to a lower value. The direction of the force on the shaft 12 indicated by the direction of the arrow 13 may also be variable in order to adjust the pressure applied by the roller 4.

The roller 1 has a co-running belt 14 looped partly about it, the belt being held tensioned by a roller 15 and is intended to prevent the sheet 9 from sticking to the surface of the roller 1. The belt 14 preferably consists of a material with poor adhesion properties e.g. "Teflon" (Registered Trade Mark) or silicone.

What is claimed is:
1. An apparatus for continuously coating thin chipboard with a thermoplastic sheet comprising:
   (a) a roller heated to a temperature above the temperature at which the sheet becomes plastic;
   (b) a guide roller;
   (c) a pressure application roller positioned downstream of the guide roller;
   (d) a flexible endless belt passing around the guide roller and the pressure application roller;
   (e) said guide roller and pressure application roller positioned adjacent to said heated roller to tension the belt against the heated roller and to partly wrap the belt around the heated roller;
   (f) means for positioning a continuous thermoplastic sheet between the chipboard and the heated roller; and
   (g) means for providing a selectively higher pressure on the belt towards the heated roller by the pressure application roller, to provide a brief increased pressure between the sheet and chipboard.

2. A press according to claim 1, which includes means for running together simultaneously with the thin chipboard on one side thereof two sheets of thermoplastic material into contact with the heated roller and means for positioning a web paper or fabric in between the two plastic sheets.

3. A press according to claim 1 in which the sheet lies directly on the roller.

4. A press according to claim 1 in which the surface of the roller has a relief pattern.

5. A press according to claim 1 which includes an endless co-running belt comprising a material of poor adhesion properties, running onto the surface of the roller.

6. A press according to claim 5 in which the co-running belt has a relief pattern positioned thereon.

References Cited
UNITED STATES PATENTS

| | | | |
|---|---|---|---|
| 3,188,259 | 6/1965 | Leger | 156—380 |
| 2,556,008 | 6/1951 | Spalding | 219—19 |
| 3,562,048 | 2/1971 | Loew | 156—209 |
| 3,053,310 | 9/1962 | Spooner | 156—499 |
| 3,481,818 | 12/1969 | Wellen | 161—2 |
| 290,553 | 12/1883 | Edson | 156—543 |
| 3,594,245 | 7/1971 | Hayes | 156—62.2 |

WILLIAM A. POWELL, Primary Examiner

B. J. LEITTEN, Assistant Examiner

U.S. Cl. X.R.

156—209, 219, 289, 312, 555